United States Patent
Bauchot et al.

(10) Patent No.: US 7,600,267 B2
(45) Date of Patent: Oct. 6, 2009

(54) PREVENTING A COPY OF A PROTECTED WINDOW

(75) Inventors: Frederic Bauchot, Saint-Jeannet (FR); Jean-Luc Collet, La Gaude (FR); Beatrice Coulomb, Cagnes sur Mer (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 11/153,708

(22) Filed: Jun. 14, 2005

(65) Prior Publication Data

US 2006/0090210 A1    Apr. 27, 2006

(30) Foreign Application Priority Data

Oct. 21, 2004    (EP) .................. 04300701

(51) Int. Cl.
*G06F 7/04* (2006.01)
(52) U.S. Cl. ........................................ 726/33
(58) Field of Classification Search ............... 380/205, 380/200; 726/33; 713/165, 167, 176
See application file for complete search history.

(56) References Cited

U.S. PATENT DOCUMENTS 5,881,287 A * 3/1999 Mast ..................... 717/127
6,922,693 B1   7/2005 Rubin et al.
2003/0084339 A1   5/2003 Roginsky et al. ............ 713/201
2004/0019644 A1   1/2004 Fellenstein et al. .......... 709/206

FOREIGN PATENT DOCUMENTS

EP          1586998 A1   10/2005
WO      2004/066156 A1    8/2004

OTHER PUBLICATIONS

EPO, European Search Report re French Application No. 05109305. 2-2212, dated Dec. 4, 2007, 5 pp.

* cited by examiner

*Primary Examiner*—Emmanuel L Moise
*Assistant Examiner*—Ali S Abyaneh
(74) *Attorney, Agent, or Firm*—Patrick J. Daugherty; Driggs, Hogg, Daugherty & Del Zoppo Co., LPA

(57) ABSTRACT

A method, system and computer readable program on a medium for masking a window or a visible part of a window during a copy screen or copy window operation which:
  provides a primitive to indicate to a window manager whether or not the window comprises information to be copy protected.
  defines a new window attribute to indicate non-copyability of the window.
  updates window attributes when this window is copy protected:
    masks all or part of the window content when the window is no longer active, so that protected information on this window is no longer visible, and
    displays the original window content when the window becomes active again.

6 Claims, 7 Drawing Sheets

PREVENTING A COPY OF A PROTECTED WINDOW

FIELD OF THE INVENTION

The present invention relates to computers and, more particularly, to a method and system for preventing a copy of a protected window displayed on a computer screen.

BACKGROUND OF THE INVENTION

When a mail is sent to a recipient, some operations may be forbidden by the sender. In Lotus Notes ("Lotus Notes" is a trademark of International Business Machines Corporation), the sender can decide to prevent the copy of a mail by selecting the option "prevent copy" in the delivery options menu. This has for effect to prevent either the forwarding of the message to another person, or the printing of the message or the copy/paste of the message content. However in the Microsoft Windows ("Windows" is a trademark of Microsoft Corporation) operating system, it is always possible to capture the entire screen (Ctrl+PrintScreen) or the active window (Alt+PrintScreen) to the clipboard. This may lead to diffuse restricted information to third parties without the authorization or control of the mail originator.

FIG. 1 shows a copy screen of a mail (101) on which the sender has selected the option "prevent copying" (102) according to prior art.

FIG. 2 shows a copy of an active window (201) containing a mail (202) on which the sender has selected the option "prevent copying" according to prior art.

SUMMARY OF THE INVENTION

The present invention is directed to a system, method and computer program as defined in independent claims for preventing copy of a protected window.

Further embodiments of the invention are provided in the appended dependent claims.

The main object of the present invention is to mask the window or a visible part of the window during the copy screen or copy window operation. The invention:

provides the application with a primitive to indicate to a window manager whether or not the window comprises sensitive information that must be copy protected.

defines a new window attribute to indicate that the window cannot be copied.

updates window attributes when this window is copy protected:

masks all or part of the window content when the window is no longer active, so that protected information on this window is no longer visible, and retrieves and displays the original window content when the window becomes active again.

at the reception of a command for copying the active window or the screen, masks temporarily all or part of the content of the active window if this active window is copy protected, so that confidential information on this window is no longer visible during the copy window or copy screen operation.

The foregoing, together with other objects, features and advantages of this invention, can be better appreciated with reference to the following description, claims and drawings.

BRIEF DESCRIPTION OF THE DRAWINGS

The novel and inventive features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

Figure 1:
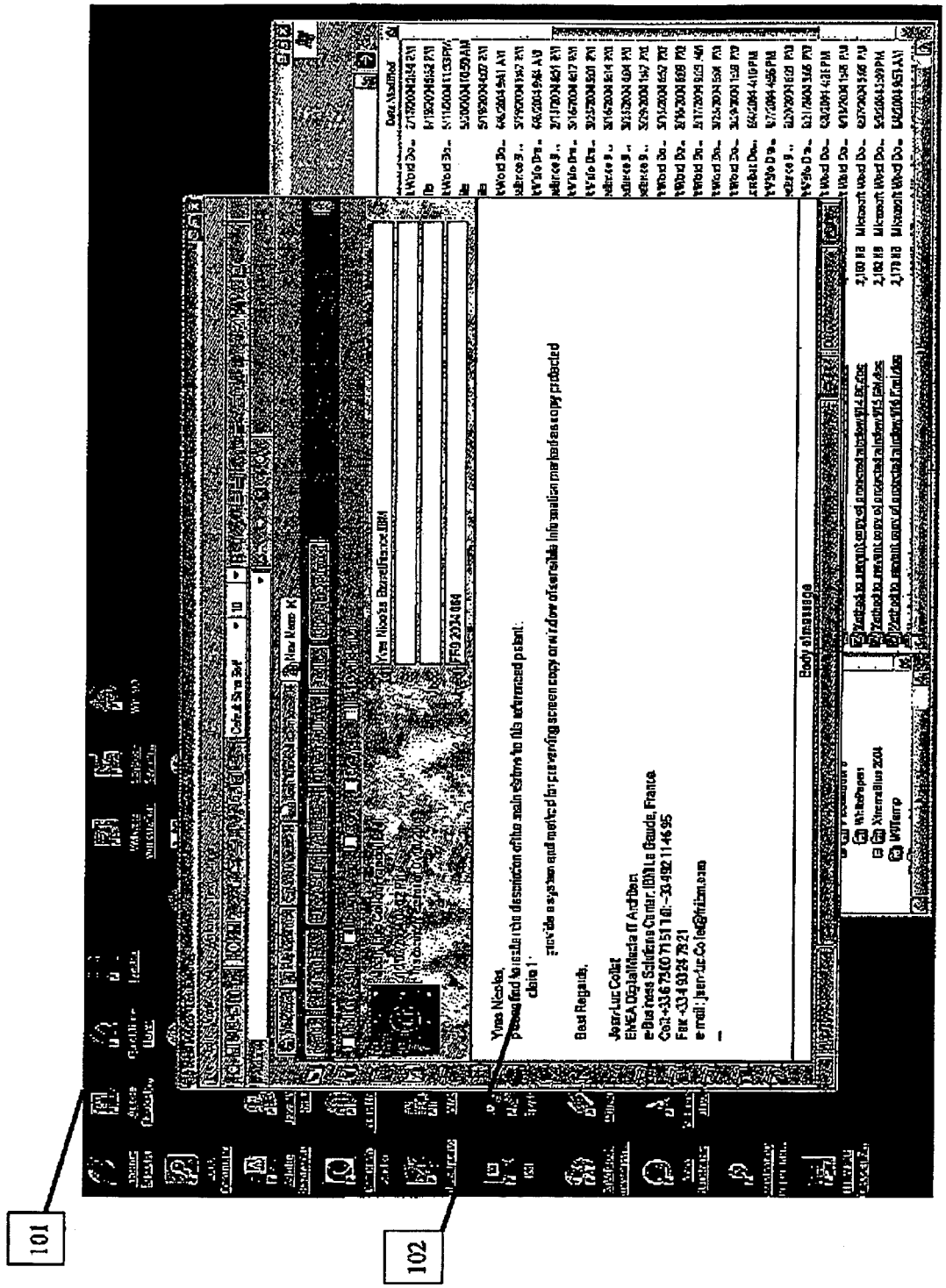
FIG. 1 shows a copy screen with a window comprising a mail for which the sender has selected the option "prevent copying" according to prior art.
Figure 2:
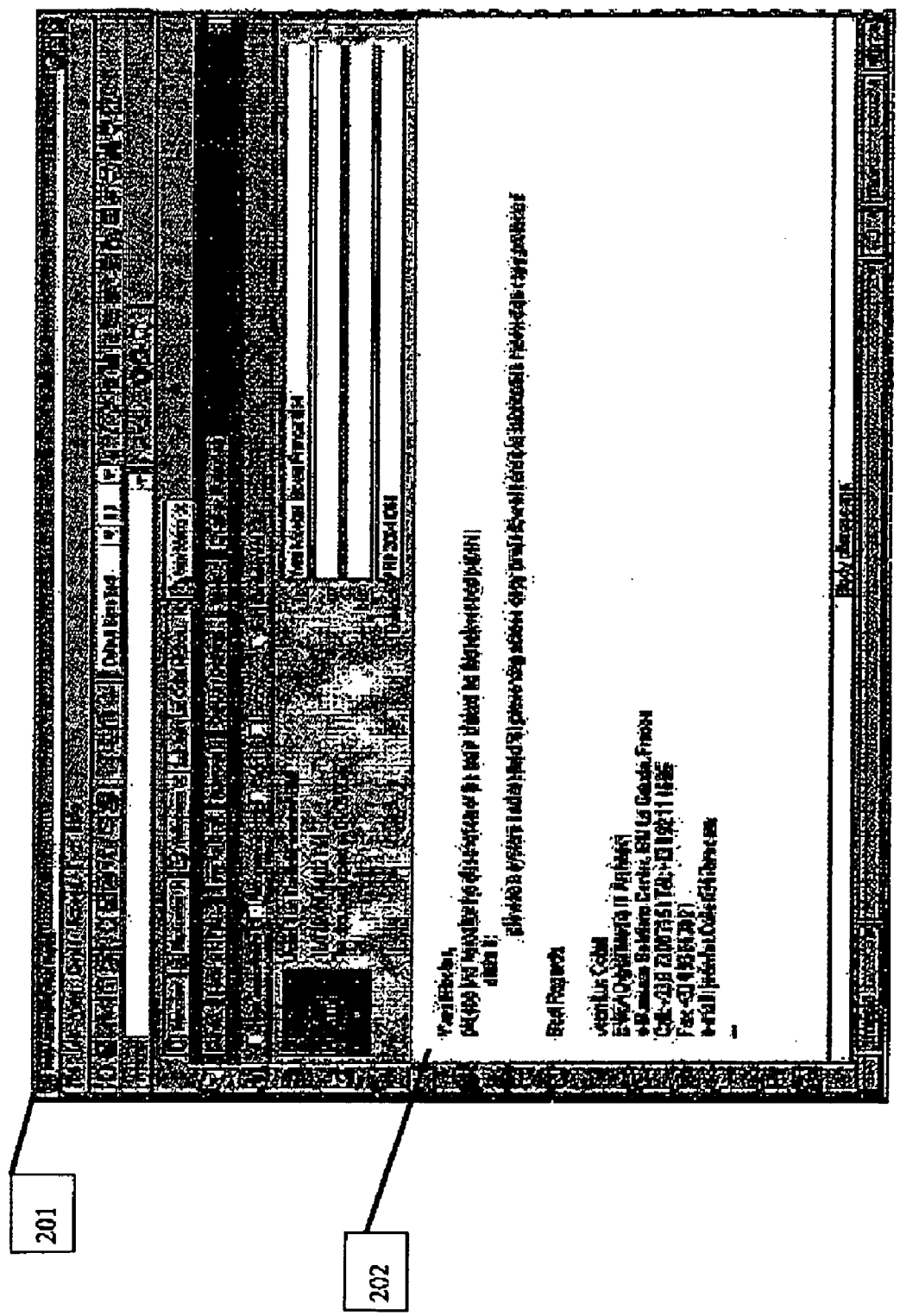
FIG. 2 shows a copy of an active window comprising a mail for which the sender has selected the option "prevent copying" according to prior art.
Figure 3:
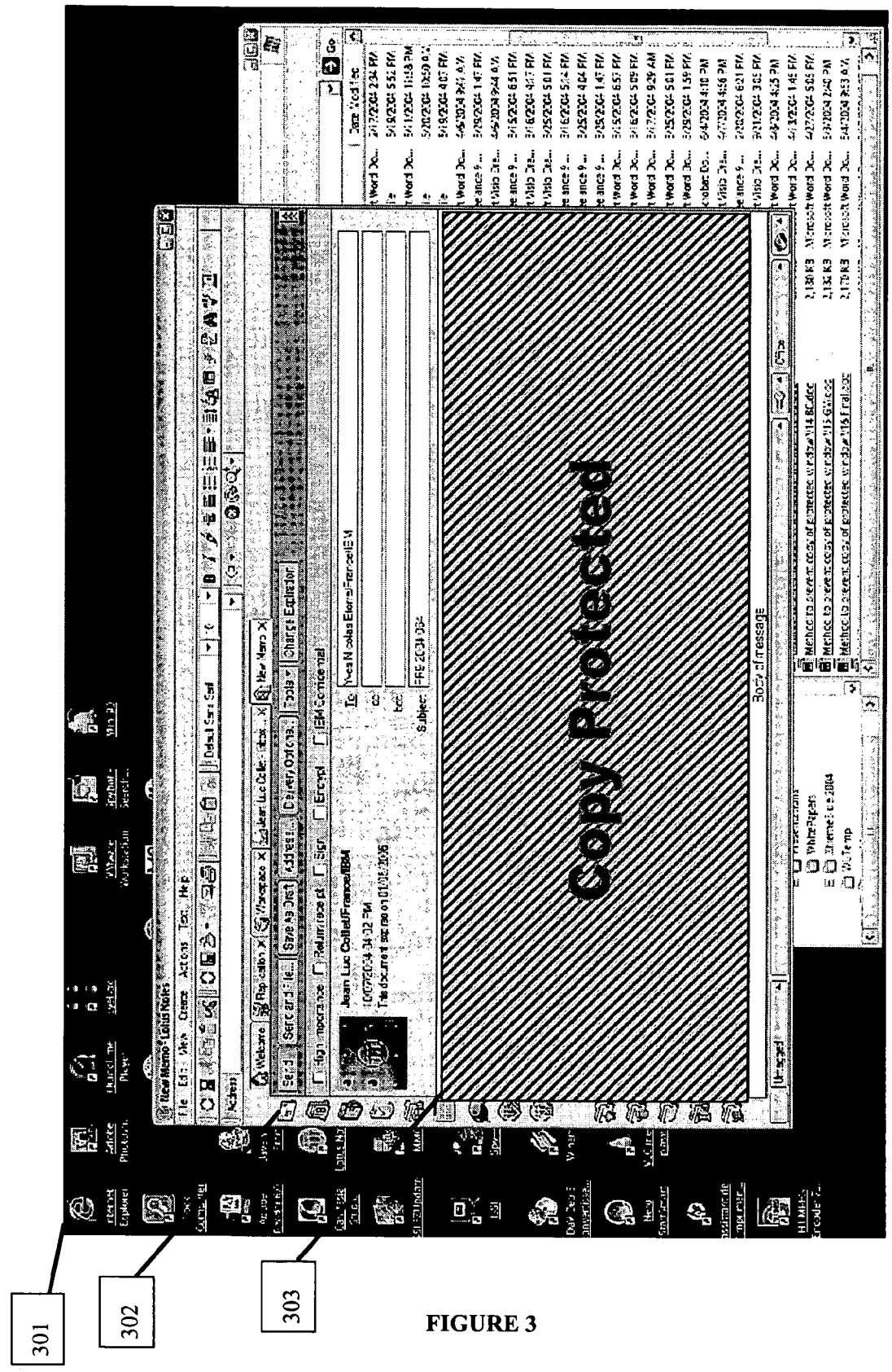
FIG. 3 shows the result of a copy screen with a window comprising sensible information (303) masked according to the present invention.
Figure 4:
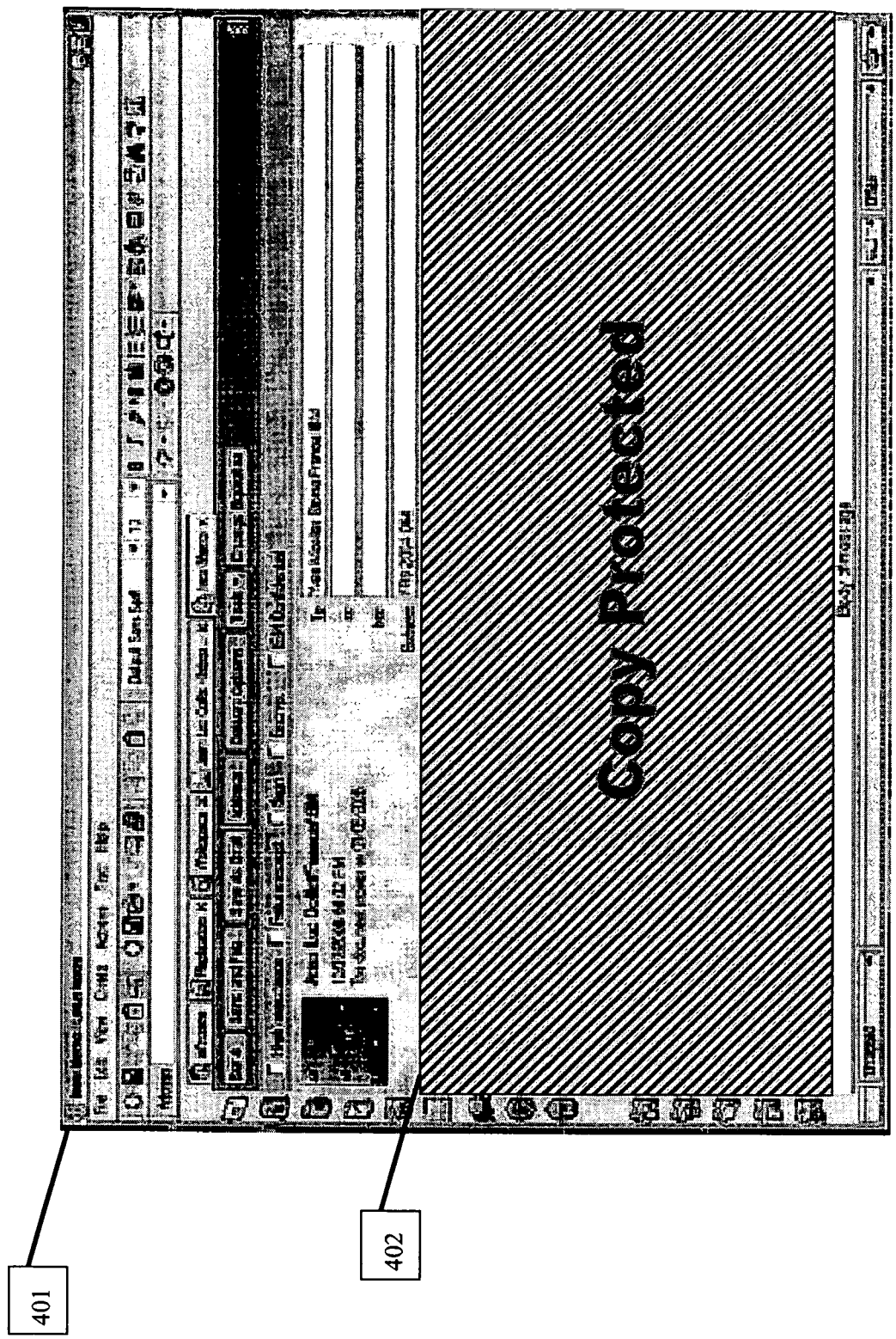
FIG. 4 shows a copy of an active window comprising sensible information masked according to the present invention.

The principle of the solution is to mask a window or the visible part of a window comprising sensitive information. So after a copy screen, all the windows comprising sensitive information (for instance, confidential information or information that must be kept secret) are masked. FIG. 3 shows the result of a copy of a screen (301) according to the present invention. The sensible information in the copy protected window (302) is masked (303) when a window or screen copy event occurs. FIG. 1 shows the copy of the same screen when the present invention is not implemented. Similarly, FIG. 4 shows the result of a copy of a copy protected active window (401) according to the present invention. The sensible information in the active window is masked. FIG. 2 shows the copy of the same active window when the present invention is not implemented.

INTRODUCTION

The preferred embodiment of the present invention relies on all the Microsoft Windows operating system family. In a graphical Microsoft Windows-based application, a window is a rectangular area of the screen where the application displays output and receives input from the user. A window shares the screen with other windows, including windows from other applications. Only one window at a time can receive input from the user. The user can use the mouse, the keyboard, or other input devices to interact with this window and the application that owns it. Microsoft windows can be of different types (Overlapped, Pop-up, Child, Layered, Message Only). The various window types will not be described in detail in the present description. The most important principles to understand the problem that the present invention proposes to solve are:

The "z-order notion"
The hook mechanism

The "Z-Order Notion"

The z-order of a window indicates the window's position in a stack of overlapping windows. This window stack is oriented along an imaginary axis, the z-axis, extending outward from the screen. The window at the top of the z-order overlaps all other windows. The window at the bottom of the z-order is overlapped by all other windows.

The system maintains the z-order in a single list. It adds windows to the z-order based on whether they are topmost windows, top-level windows, or child windows.

A topmost window overlaps all other non-topmost windows, regardless of whether it is the active or foreground window. A topmost window has the WS EX TOPMOST-style. All topmost windows appear in the z-order before any non-topmost windows.

A top-level window is a window with no parents except the main desktop window versus child windows belonging to a top-level window.

A child window is grouped with its parent in z-order.

The Hook Mechanism

In the Microsoft Windows operating system, a hook is a mechanism by which a function can intercept events (messages, mouse actions, keystrokes) before they reach an application. The function can act on events and, in some cases, modify or discard them. Functions that receive events are called filter functions and are classified according to the type of event they intercept. For example, a filter function may want to receive all keyboard or mouse events. For Windows, the filter function must be installed—that is, attached—to a Windows hook (for example, to a keyboard hook). Attaching one or more filter functions to a hook is known as setting a hook. If a hook has more than one filter function attached, Windows maintains a chain of filter functions. The most recently installed function is at the beginning of the chain, and the least recently installed function is at the end.

The Microsoft Win32 ("Win32" is a trademark of Microsoft Corporation) application programming interface (API) provides a set of functions to access, modify:
    the z-order list,
    the windows position and styles,
    the hook operating system mechanism.

DESCRIPTION OF THE INVENTION

With the Microsoft Windows Operating system, all the graphical windows are message driven. All the windows have at least one thread responsible to process messages received from the system (for instance, user mouse events). This thread is called the WindowProc and can send messages to any other windows/applications.

Microsoft Hook

Hooks mechanisms provide powerful capabilities for Windows-based applications. These applications can use several options to set a hook:
    Process or modify all messages meant for all the dialog boxes, message boxes, scroll bars, or menus for an application (WH_MSGFILTER).
    Process or modify all messages meant for all the dialog boxes, message boxes, scroll bars, or menus for the system (WH_SYSMSGFILTER).
    Process or modify all messages (of any type) for the system whenever a GetMessage or a PeekMessage function is called (WH_GETMESSAGE).
    Process or modify all messages (of any type) whenever a SendMessage function is called (WH_CALLWNDPROC).
    Record or play back keyboard and mouse events (WH_JOURNALRECORD, WH_JOURNALPLAYBACK).
    Process, modify, or remove keyboard events (WH_KEYBOARD).
    Process, modify, or discard mouse events (WH_MOUSE).
    Respond to certain system actions, making it possible to develop computer-based training (CBT) for applications (WH_CBT).
    Prevent another filter from being called (WH_DEBUG).

Applications use hooks to:
    Provide F1 help key support to menus, dialog boxes, and message boxes (WH_MSGFILTER).
    Provide mouse and keystroke record and playback features, often referred to as macros. For example, the Windows Recorder accessory program uses hooks to supply record and playback functionality (WH_JOURNALRECORD, WH_JOURNALPLAYBACK).
    Monitor messages to determine which messages are being sent to a particular window or which action a message generates (WH_GETMESSAGE, WH_CALLWNDPROC). The Spy utility program in the Platform SDK uses hooks to perform these tasks. The source for Spy is available in the SDK.
    Simulate mouse and keyboard input (WH_JOURNALPLAYBACK). Hooks provide the only reliable way to simulate these activities. If you try to simulate these events by sending or posting messages, Windows internals do not update the keyboard or mouse state, which can lead to unexpected behavior. If hooks are used to play back keyboard or mouse events, these events are processed exactly like real keyboard or mouse events. Microsoft Excel uses hooks to implement its SEND.KEYS macro function.
    Provide CBT for applications that run in the Windows environment (WH_CBT). The WH_CBT hook makes developing CBT applications much easier.

Implementation

In a preferred embodiment of the invention, two primitives are defined. The objectives of these primitives are:
    1. to set a Window attribute to indicate whether or not the window is copy protected. By default, the value is not copy protected.
    2. to set a hook when a first window must be copy protected and to remove this hook when the last copy protected window becomes unprotected.

Figure 5A:
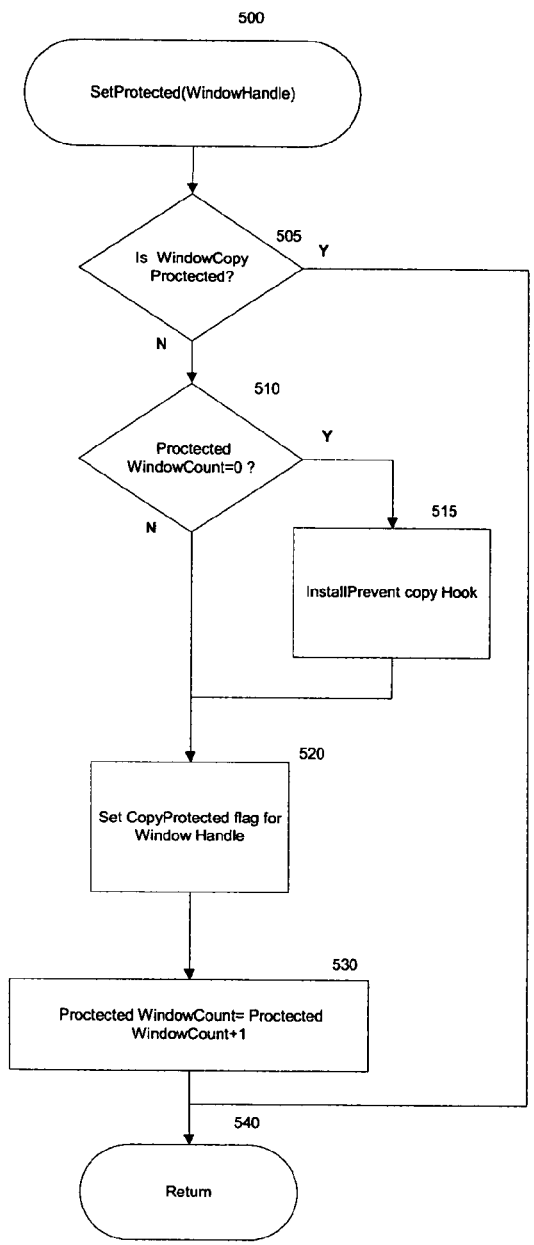
FIG. 5A shows the setting of a Window attribute to indicate whether or not the window is copy protected according to the present invention.
Figure 5B:
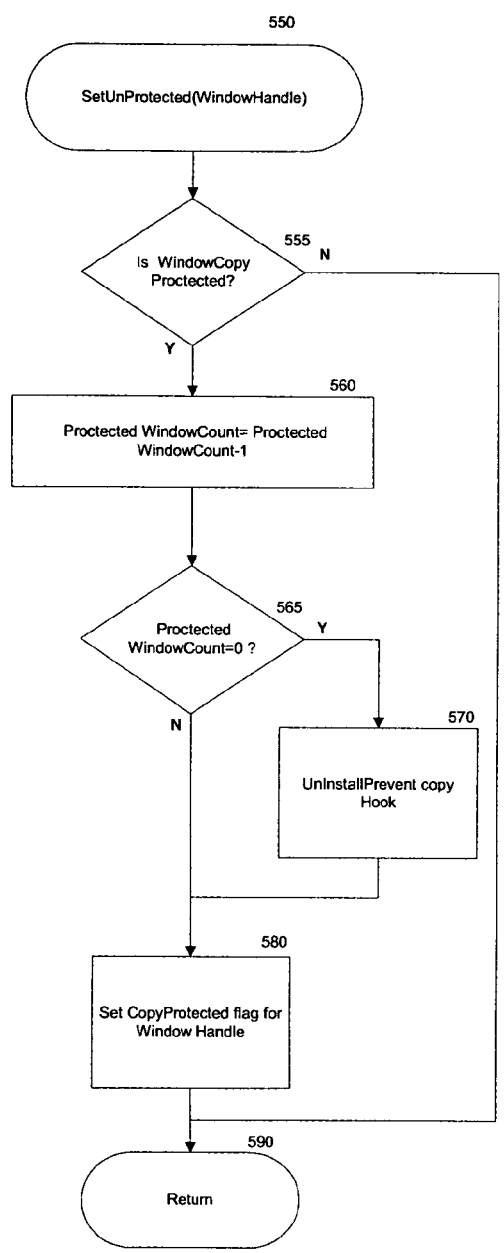
FIG. 5B shows the setting of a hook when the first window is copy protected and the removal of the hook when the last active copy protected window becomes unprotected according to the present invention.

The behavior of these two primitives is illustrated in FIGS. 5A and 5B.

FIG. 5A shows the setting of a window attribute to indicate whether or not the window is copy protected.

When the primitive "SetProtected" 500 is invoked with "window handle" as parameter, a first checking is done to verify whether the window is "copy protected" or not 505. The parameter "window handle" identifies the window. This identifier is unique for each window.

If the window is already in the state "copy protected", nothing is done and control is returned to the calling application 540.

If the window is in the state "copy unprotected", another checking is done to determine whether or nor the present window is the first window to be in the state "copy protected" 510.

If it is the first window to be set in the state "copy protected", the hook code called "InstallPrevent copy hook" is installed 515. This installation is not executed at the system initialization time, but when a window needs to be protected. This operation mode prevents a degradation of the system performances when no window needs to be copy protected.

In all cases, the flag "CopyProtected" is set to the value "true" 520 for the window identified by the "window handle" parameter passed as argument of the "SetProtected" primitive.

The "ProtectedWindowCount" variable is incremented by one 530. This variable is used to determine the current number of windows that are copy protected.

Finally, the control is returned to the calling application 540.

FIG. 5B shows the setting of a hook when the first window is copy protected and the removal of the hook when the last active copy protected window becomes unprotected.

When the primitive "SetUnProtected" 550 is invoked with the "window handle" as parameter, a first checking is done to verify whether or not the window is in a "copy protected" state 555.

If the window is not in the state "copy protected", nothing is done and the control is returned to the calling application 590.

If the window is in the state "copy protected",

The "ProtectedWindowCount" variable is decremented by one 560.

Then another checking is done to determine whether or not the window is the last window to be in the state "copy protected" 570.

If the window is the last window to be in the status "copy protected", the hook code called "InstallPrevent copy hook" is removed 570.

In all cases, the flag "WindowCopyProtected" is set to the value "False" 580 for the window identified by the "window handle" parameter passed as argument of "SetProtected" primitive.

Finally, the control is returned to the calling application 590.

Figure 6:
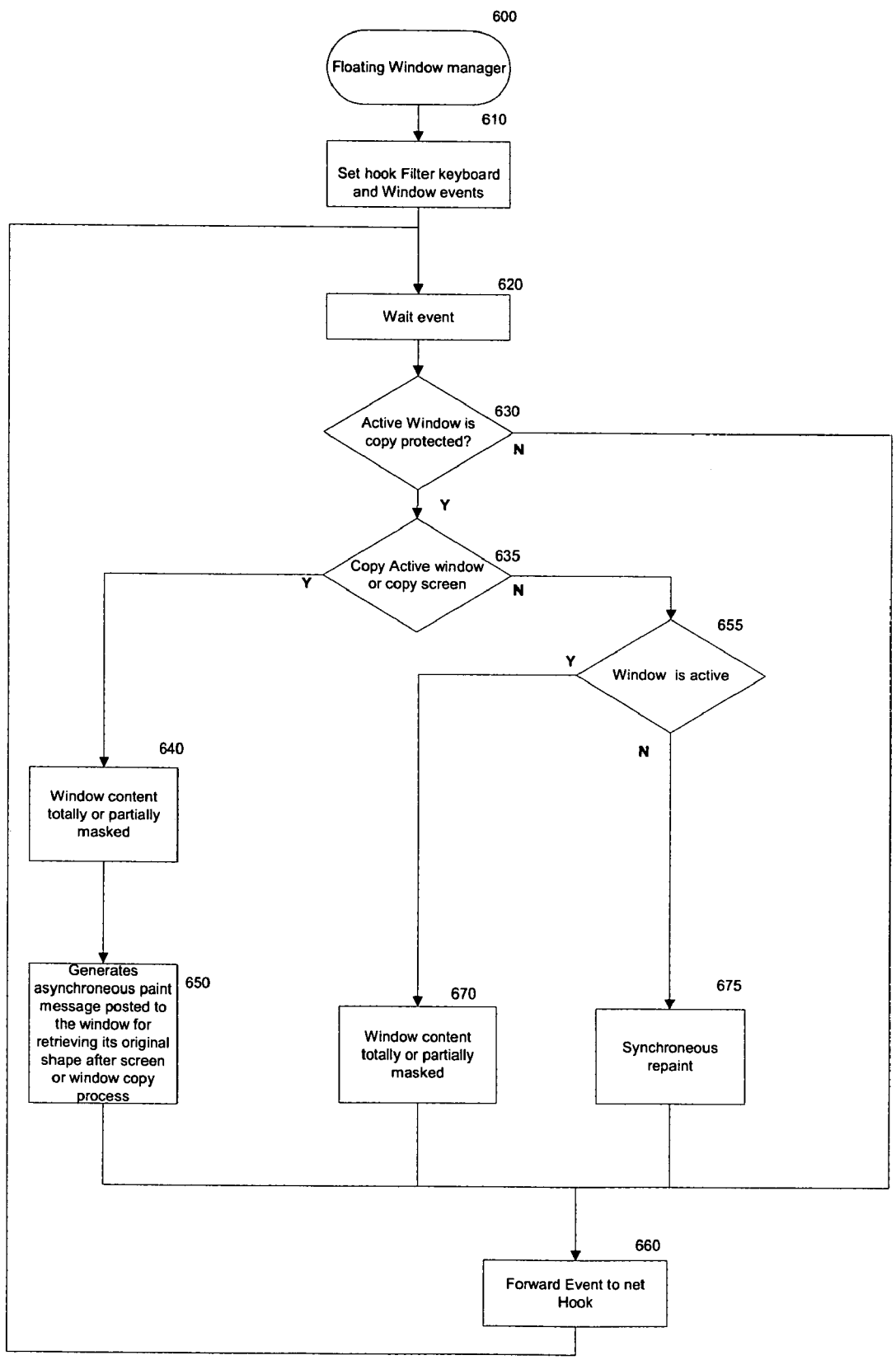
FIG. 6 is a general flow chart describing the method according to the present invention.
Figure 7:
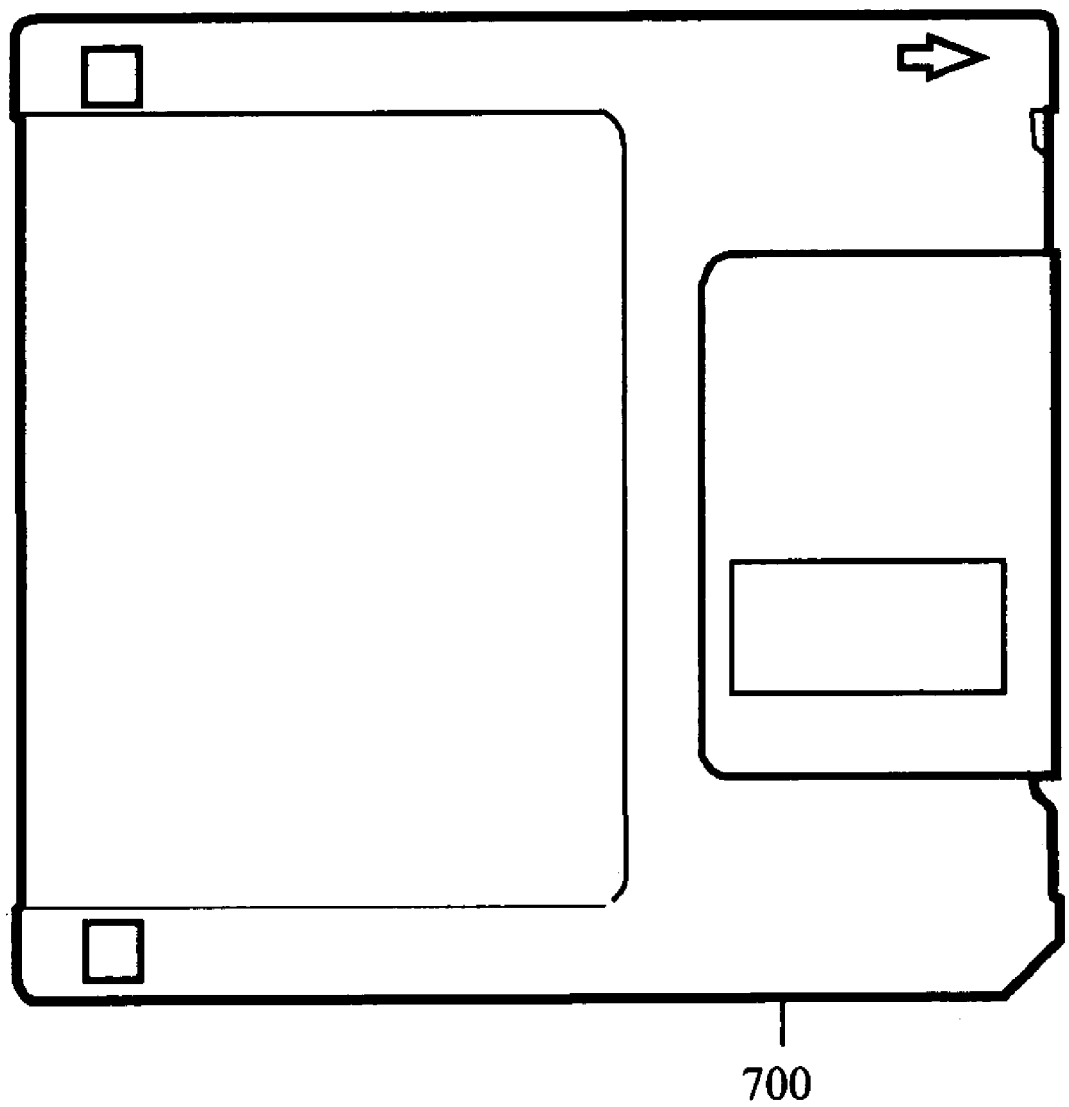
FIG. 7 is a front elevational view of a computer readable disc with the program of the present invention thereon.

FIG. 6 is a general flow chart showing the steps of the method according to a preferred embodiment of the invention, and FIG. 7 shows a computer readable disc 700 with the program thereon. It is to be understood that the disc is only one form of computer readable media that could contain the program. For example, the program could reside on an integrated circuit chip. The floating window manager 600 is the application in charge to install and remove the present invention on the computer system.

With the Microsoft Windows operating system, a hook filter is a dynamic library registered at the system level. To set such hook filter, it is necessary to initialize and configure the hook mechanism using the "SetWindowsHook" win32 API. The same kind of action is necessary to remove such hook filter from the system using the "UnhookWindowsHook" win32 API. The method according to the present invention comprises the following steps, and the system includes logic to invoke the commands:

At step 610, the setting of the hook filter during initialization consists in registering a dynamic library exporting a callback function executed each time an event occurs. As previously described, a hook can be set up with different kinds of events (WH_KEYBOARD, WH_MOUSE, ... ). In the present invention, the hook filter is set on predefined window events and keyboard events (for instance: WH_KEYBOARD & WH_GETMESSAGE & WH_CALLWNDPROC). This step can be removed if the "InstallPreventCopy hook" is dynamically added and removed as described in FIGS. 5A and 5B.

At step 620, the Win32 operating system maintains a list of all the active hooks set up by applications. Each time an event occurs, the Win32 operating system lookups in this list to send the event message to all the callback functions registered for such type of event. The callback function is called with, as parameter, the event message, and then the application code is executed.

At step 630, when a predefined window or keyboard event is received, an initial checking is done to identify whether or not the active window is a copy protected window. If the active window is copy protected, then control is given to step 635, otherwise control is given to step 660.

At step 635, a checking is done to determine whether or not the received event corresponds to a request for copying the active window or screen to the clipboard. In Microsoft Window environment, these functions are identified by the keying of CTRL+PrintScreen to copy screen and ALT+PrintScreen to copy active window. If the screen is partially or totally marked for an active window or screen, then control is given to step 640, otherwise control is given to step 655.

At step 640, all or part of the active window is synchronously masked (for instance, shaded or painted in grey) as shown in FIG. 3 (303) and FIG. 4 (401).

At step 650, an asynchronous window message is sent to the active window. This message will be processed later by the active window after the execution of the window or screen copy to restore the window in its initial state. Then control is given to step 660.

At step 655, a checking is done to determine whether or not the received event corresponds to the activation of the copy protected window. If the received event is to activate the copy protected window, control is given to step 675, otherwise control is given to step 670.

At step 660, the received event is forwarded to the next hook or to the target application, and control is given back to step 620 in order to wait for the next-to-come event.

At step 670, all or part of the active window is masked (for instance, shaded or painted in grey) as shown in FIGS. 3 and 4. Then, control is given to step 660.

At step 675, a synchronous window message is sent to the active window. This message is processed by the active window to restore the window in its initial state. Then, control is given to step 660.

Example of an Implementation Using Lotus Notes

In Lotus Notes, each time a user opens a mail, an external program is called to check whether the mail is protected or not. Technically, the interception of the mail is performed using a "queryopen" event of the memo form. The value of the internal Lotus Notes variable called "$KeepPrivate" indicates whether the document is protected or not. The way to call an external program is described in the following section.

Calling an External C Program from Lotus Notes

LotusScript ("LotusScript" is a trademark of International Business Machines Corporation) allows the call external C language functions. The principle is to implement external C functions inside a named library module that generally comprises several C functions. With Windows, this is a Dynamic Link Library (DLL). All Windows users have access to the libraries in the Windows application programming interface (API). The C functions that are in the DLLs/shared libraries must be exported. Different platforms have different rules and ways for exporting them.

The Declare statement is used to call C functions comprised in an external library module from LotusScript. To avoid the declaration of external library functions in multiple scripts, "Declare Public" statements are used in a module which remains loaded.

By default, LotusScript passes arguments to functions by reference. If the argument is an array, a user-defined data type variable, or an object reference variable, the arguments are passed by reference. Generally, the "ByVal" keyword is used to pass variables by value.

What has been described is merely illustrative of the application of the principles of the present invention. Other arrangements and methods can be implemented by those skilled in the art without departing from the spirit and scope of the present invention.

What is claimed is:

1. A method for preventing copying of protected information on a window displayed on a computer screen, said method comprising the steps of:
   at the reception of a command for copying an active window of at least one window or for copying the computer screen, determining whether said active window has information protected against copying or not, using a window attribute associated with said active window;
   if determined that the active window has information protected against copying, installing and setting a hook for managing windows protected against copying and temporarily masking all or part of said active window;
   determining whether a received event corresponds to an activation of the active window;
   if determined that the received event corresponds to an activation of the active window, sending a synchronous window message to the active window, processing the synchronous window message to restore the active window to an initial state, and forwarding the received event to a next hook or to a target application in order to wait for a next-to-come event;
   if determined that the received event does not correspond to an activation of the active window, masking all or part of the active window and forwarding the received event to a next hook or to a target application in order to wait for a next-to-come event;
   determining whether the active window is a last window of the at least one window to be protected against copying; and
   if determined that the active window is the last window of the at least one window to be protected against copying, removing the hook.

2. The method according to claim 1 wherein the step of temporarily masking all or part of said active window, comprises:
   masking any protected information on said active window, so that said protected information is no longer visible on the computer screen during the copy window or copy screen operation; and
   once the masked window or the computer screen has been copied, displaying on the computer screen the active window in its initial state.

3. A system for preventing copying of protected information on a window displayed on a computer screen, said system comprising integrated circuitry configured by logic to:
   at the reception of a command for copying an active window of at least one window or for copying the computer screen, determine whether said active window has information protected against copying or not, using a window attribute associated with said active window;
   if determined that the active window has information protected against copying, install and set a hook for managing windows protected against copying and temporarily mask all or part of said active window;
   determining whether a received event corresponds to an activation of the active window;
   if determined that the received event corresponds to an activation of the active window, send a synchronous window message to the active window, process the synchronous window message to restore the active window to an initial state, and forward the received event to a next hook or to a target application in order to wait for a next-to-come event;
   if determined that the received event does not correspond to an activation of the active window, mask all or part of the active window and forward the received event to a next hook or to a target application in order to wait for a next-to-come event;
   determining whether the active window is a last window of the at least one window to be protected against copying; and
   if determined that the active window is the last window of the at least one window to be protected against copying, remove the hook.

4. The system according to claim 3, further configured to temporarily mask all or part of said active window by:
   masking any protected information on said active window, so that said protected information is no longer visible on the computer screen during the copy window or copy screen operation; and
   once the masked window or the computer screen has been copied, displaying on the computer screen the active window in its initial state.

5. A method for preventing copying of protected information on a window displayed on a computer screen, comprising:
   producing computer executable program code;
   storing the code on a computer readable medium; and
   providing the program code to be deployed and executed on a computer system, the program code comprising instructions which, when executed on the computer system, cause the computer system to:
   at the reception of a command for copying an active window of at least one window or for copying the computer screen, determine whether said active window has information protected against copying or not, using a window attribute associated with said active window;
   if determined that the active window has information protected against copying, install and set a hook for managing windows protected against copying and temporarily mask all or part of said active window;
   determine whether a received event corresponds to an activation of the active window;
   if determined that the received event corresponds to an activation of the active window, send a synchronous window message to the active window, process the synchronous window message to restore the active window to an initial state, and forward the received event to a next hook or to a target application in order to wait for a next-to-come event;
   if determined that the received event does not correspond to an activation of the active window, mask all or part of the active window and forward the received event to a next hook or to a target application in order to wait for a next-to-come event;

determine whether the active window is a last window of the at least one window to be protected against copying; and if determined that the active window is the last window of the at least one window to be protected against copying, remove the hook.

6. The method of claim 5, the program code comprising instructions which, when executed on the computer system, further causes the computer system to temporarily mask all or part of said active window by:

masking any protected information on said active window, so that said protected information is no longer visible on the computer screen during the copy window or copy screen operation; and once the masked window or the computer screen has been copied, displaying on the computer screen the active window in its initial state.

\* \* \* \* \*

UNITED STATES PATENT AND TRADEMARK OFFICE
CERTIFICATE OF CORRECTION

PATENT NO. : 7,600,267 B2  Page 1 of 1
APPLICATION NO. : 11/153708
DATED : October 6, 2009
INVENTOR(S) : Bauchot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1129 days.

Signed and Sealed this

Fourteenth Day of December, 2010

David J. Kappos
*Director of the United States Patent and Trademark Office*